United States Patent
Mikhall et al.

(10) Patent No.: US 6,731,017 B2
(45) Date of Patent: May 4, 2004

(54) DISTRIBUTED POWERTRAIN THAT INCREASES ELECTRIC POWER GENERATOR DENSITY

(75) Inventors: Amir S. Mikhall, Santa Barbara, CA (US); Edwin C. Hahlbeck, Pewaukee, WI (US)

(73) Assignee: Clipper WindPower Technology, Inc., Carpenteria, CA (US)

( * ) Notice: Subject to any disclaimer, the term of this patent is extended or adjusted under 35 U.S.C. 154(b) by 81 days.

(21) Appl. No.: 10/213,764

(22) Filed: Aug. 7, 2002

(65) Prior Publication Data

US 2003/0222456 A1 Dec. 4, 2003

Related U.S. Application Data

(60) Provisional application No. 60/385,763, filed on Jun. 3, 2002.

(51) Int. Cl.⁷ .............................................. H02K 23/60
(52) U.S. Cl. ..................... 290/1 C; 310/75 R; 74/785
(58) Field of Search ................. 290/1 R, 1 A, 290/1 B, 1 C; 310/75 R, 74; 74/661, 655, 785

(56) References Cited

U.S. PATENT DOCUMENTS 4,090,413 A * 5/1978 Vickland ............... 74/665 GB
4,128,020 A * 12/1978 Gray ........................... 74/572
4,685,354 A * 8/1987 McCabria ..................... 475/5
4,691,119 A * 9/1987 McCabria .................... 307/84
6,118,194 A * 9/2000 Kawamura ............... 310/75 R
6,304,002 B1 * 10/2001 Dehlsen et al. ............. 290/1 C

FOREIGN PATENT DOCUMENTS

FR           2 691 025       * 5/1992

* cited by examiner

*Primary Examiner*—Nicholas Ponomarenko
(74) *Attorney, Agent, or Firm*—Owen L. Lamb

(57) ABSTRACT

A power source drives a main input shaft. A plurality of output shafts are located around a bull gear which is coupled to the main input shaft. A number of generators are each coupled to a respective one of the output shafts, such that each one of the output shafts drives a generator. A number of intermediate gears are located around a perimeter of the bull gear, alternating half of the intermediate gears on one side of the bull gear and half on an opposite side of the bull gear. Each one of the intermediate gears is pressure fitted to an intermediate pinion with teeth that engage the bull gear teeth. Each one of the output shafts has two pinions that engage two intermediate gears, one on one side of the bull gear and one on an opposite side of the bull gear.

20 Claims, 3 Drawing Sheets

SECTION 3-3

DISTRIBUTED POWERTRAIN THAT INCREASES ELECTRIC POWER GENERATOR DENSITY

CROSS-REFERENCE TO RELATED APPLICATIONS

This application is a continuation-in-part of U.S. Provisional Patent Application No. 60/385,763 entitled "Improved Distributed Powertrain That Doubles Electric Power Generator Density" filed Jun. 3, 2002, which is incorporated herein by reference.

BACKGROUND OF THE INVENTION

1. Field of the Invention

This invention relates to electric power-generating devices and more particularly to an apparatus for distributing a source of energy (such as the input torque characteristic of low rotational velocity, high-torque operation of any power source such as wind or water turbine blades) to multiple power generators.

2. Description of the Prior Art

U.S. Pat. No. 6,304,002 granted on Oct. 16, 2001 describes an electric power-generating device comprising a rotor which revolves in response to an external source of mechanical energy. The rotor is coupled to a main power input shaft. The powertrain for wind and ocean current turbines consists of a large, main input power shaft-mounted, rotating bull-gear with stationary smaller pinions mounted around its periphery. The gear teeth on the bull gear rotate past the teeth on pinions, causing the pinions to turn and deliver power to a second stage. The final stage is connected to a plurality of electric generators. This process can be repeated in multiple stages.

As turbines grow in size, the size and weight of individual components grow as well. Wind turbines place these components on top of a tower, presently stretching to over 100 m above the ground, while ocean current turbines are located at sea, where they can only be accessed by boat. The size of the components necessitates very large lifting equipment, making both the land-based cranes and ocean lifting equipment extremely costly.

By dividing the powertrain into smaller components, generating systems receive an element of redundancy. For example, when ten small gearboxes and generators split the system's load, if one gearbox or generator experiences a fault, the system's capacity may only be reduced by 10%, allowing the system to remain active. A single generator system loses all of its capacity when the generator experiences a fault.

SUMMARY OF THE INVENTION

Briefly, in accordance with the invention, an electric power-generating device comprises a rotor which revolves in response to an external'source of energy, such as wind or water currents or any other power source, to which is coupled a main power input shaft. A torque-dividing gearbox having a circular wheel or gear is coupled to the input shaft driven by the rotor. The torque-dividing gearbox has a plurality of output shafts located around the input shaft. A number of stage-2 wheels or gears are located around a perimeter of the circular gear, half of the stage-2 gears on one side of the circular gear and half on an opposite side of the circular gear. Each one of the stage-2 gears has a stage-2 shaft with a pinion that engages circular gear teeth on the circular gear, and pressure connected to this pinion is a larger circular wheel or gear. Hereafter the assembly of the stage 2 pinion and the pressure connected gear is called the "intermediate assembly", the pinion in the intermediate assembly is called the "intermediate pinion", and the gear in the intermediate assembly is called the "intermediate gear". Each one of the output shafts engages two intermediate gears, one intermediate gear on one side of the circular gear and one intermediate gear on an opposite side of the circular gear. Each intermediate gear is engages two output shafts, allowing significant size reduction of the intermediate gears and the output shafts. A number of generators are each coupled to respective ones of the output shafts.

In accordance with an aspect of the present invention, the powertrain consists of a large, input power shaft-mounted, rotating bull-gear with stationary smaller intermediate gears mounted around its periphery. Additional stages can be added using the same concept.

The tooth loads on the bull gear are divided n times, where n equals the number of generators, and tooth loads on the intermediate gears and high speed pinions are divided by n×2. The invention has the advantage that the lessened tooth loads allow for smaller gears and bearings, increasing power density and reducing mass and cost.

The invention has the further advantage that the large and expensive bull gear is reduced because it transfers torque from many teeth simultaneously. Furthermore, all the tooth engagements are unidirectional, that is, not reversing, with the advantage of allowing higher loads than other systems such as planetary systems.

BRIEF DESCRIPTION OF THE DRAWINGS

The invention will be described in detail with reference to the drawings in which.

DESCRIPTION OF THE PREFERRED EMBODIMENTS

In this specification the terms "gear" and "pinion" refer to machine components consisting of a wheel attached to a rotating shaft that operate in pairs to transmit and modify rotary motion and torque (turning force) without slip. A wheel may or may not have gear teeth.

Figure 1:
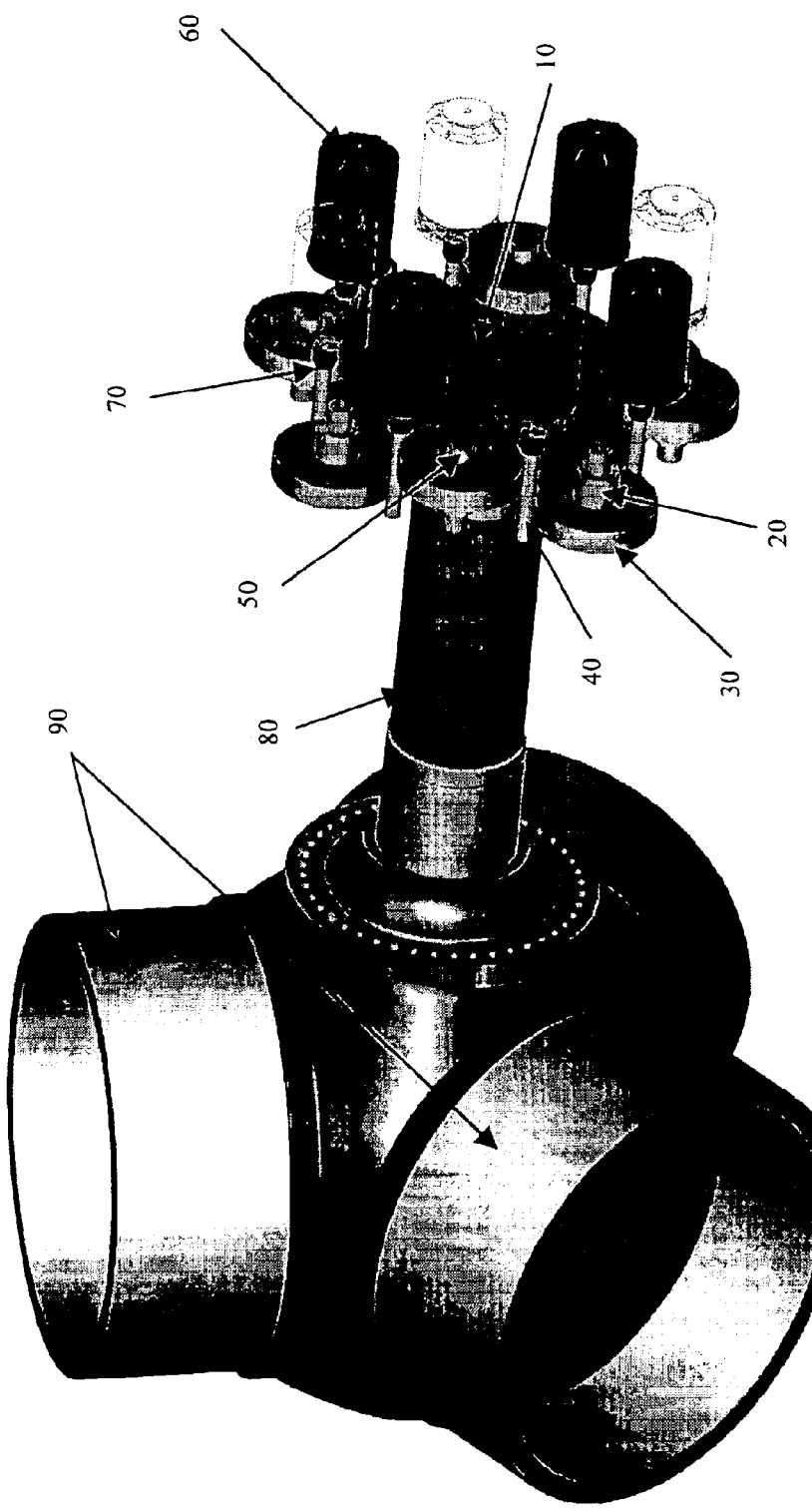
FIG. 1 is a perspective view of the invention showing a distributed powertrain having eight units.

Refer to FIG. 1, which is a perspective view of the invention showing a distributed powertrain having eight units with a split-path second stage. Rotor blades 90, or any other power source, are attached to a main shaft 80. A circular gear 10, such as bull gear, is directly attached to main shaft 80. Main shaft torque is divided through a plurality of pinions, such as intermediate pinion 20 and intermediate gears, such as gear 30. The pinion 20 is located on the same shaft 50 as the intermediate gear 30. The intermediate gears 30 are alternately located on opposite sides of the bull gear 10. Double helical, high-speed pinions 40 with helical teeth that have opposing hands on an output shaft are connected to each pair of intermediate gears 30, resulting in torque sharing of a high-speed stage comprised of two intermediate gears 30 on opposite sides of the bull gear 10. Since each intermediate gear engages with pinions on two output shafts, significant size reduction of the intermediate gears and the output shafts results. Each high-speed output shaft is connected by a coupling 70 to an electric generator 60. The high-speed output shafts may be held in place, for example by cylindrical bearings that allow for slight axial movement. If necessary, the coupling 70 may be flexible to allow axial movement of the output shaft. Of course it will be understood that coupling 70 can be eliminated if the output shaft and a generator shaft are one continuous shaft so long as slight axial movement is accommodated. The high-speed pinions 40 on the output shaft are not axially constrained by bearings or the coupling to the generator, which allows the helical teeth of the intermediate assemblies, to react in the body of the high speed pinion, canceling thrust forces. Lacking axial constraint, the torque is perfectly divided on the two helices of the high-speed pinion and the intermediate gears.

In operation, power supplied by the flow-driven rotation of rotor 90 is transmitted by rotating main shaft 80 to bull gear 10. A torque-dividing gearbox, comprising a bull gear 10, pressure-mounted on the main shaft 80 and rotating with the shaft, interacts with eight intermediate gears 30 mounted around the perimeter of the bull gear 10, causing the intermediate shafts 50 to turn at a rotational rate greater than that of the bull-gear. Each intermediate gear 30 is pressure mounted on each intermediate pinion 20, intermediate assemblies being mounted alternately on opposite sides of the bull gear 10. In this arrangement, each intermediate gear 30 is engaged with two high-speed pinions 40. The two-tooth engagement allows the intermediate gear to transmit two times the torque of single tooth engagements. The tooth pressure is unidirectional, that is, not reversing, allowing higher loads than other systems such as planetary systems.

A chamber in which the bull-gear and intermediate gears rotate is flooded with oil or contains an oil distribution system for lubrication. Each intermediate gear 30 drives two output shaft high-speed pinions 40. The intermediate gear 30 increases the rotational speed of the output shaft relative to the intermediate gear 30. The output shaft is connected by a coupling 70 to an electric generator 60. Each generator 60 is mounted to a circular plate comprising one wall of the oil-filled chamber. The smaller size of the generators relative to conventional larger generators allows for easy component handling.

In the illustration of FIG. 1, eight output shafts are shown, which will accommodate eight generators 60 coupled thereto. However for clarity four of the generators 60 are shown transparently.

The intermediate gears 30 are much smaller than conventional because the tooth loads are one-half the loads of a system of gears on one side of the bull gear 10. The smaller high-speed gears permit spacing the gears to allow the common output shaft to be driven by two gears without overlapping of the gears. Bearing forces are favorable; overturning forces and separating forces on the intermediate gears are cancelled. High speed pinions 40 are not axially constrained, allowing the helical teeth of the intermediate assemblies, which have opposing hands, to react in the body of the high speed pinion 40, canceling thrust forces. Lacking axial constraint, the torque is perfectly divided on the two helices of the high-speed pinion and the intermediate gears. Some or all generators can be taken off-line (idling) without causing problems because in that case overturning forces and separating forces are one-half magnitude of a system of gears on one side of the bull gear.

Figure 2:
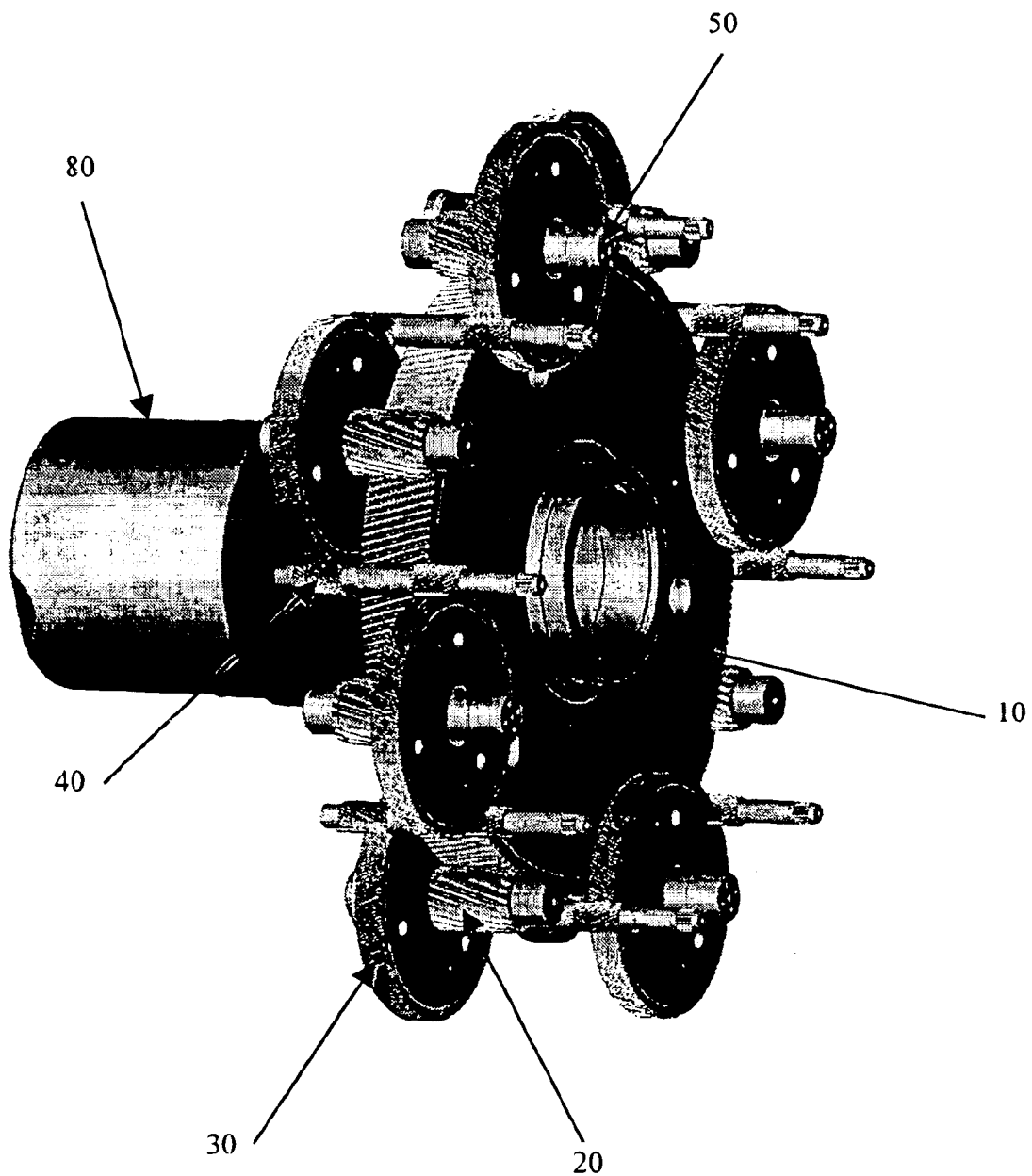
FIG. 2 is a detailed perspective view of the invention shown in FIG. 1.

FIG. 2 is a detailed view of the invention shown in FIG. 1. A wind or water current driven power generator rotor, or any other power source, is fitted onto a main input shaft 80. A torque-dividing gearbox is coupled to the main input shaft 80, which is connected to the rotor. The torque-dividing gearbox has a plurality of output shafts (with high-speed pinions 40) located around the main input shaft. A number of generators 60 are each coupled by a coupling 70 to a respective one of the output shafts, such that each one of the output shafts drives a generator 60. The generators 60 are held stationary and the torque-dividing gearbox includes a bull gear 10 fitted onto the main input shaft 80. A number of intermediate assemblies 20, 30, 50 are located and grouped in pairs around a perimeter of the bull gear 10, alternating half of the intermediate assemblies 20, 30, 50 on one side of the bull gear 10 and half on an opposite side of the bull gear 10. Each one of the intermediate gears 30 is pressure fitted to the intermediate pinion 20 with teeth that engage the bull gear 10 teeth. Each one of the output shafts has two pinions 40 that engage a pair of intermediate gears 30, one intermediate gear on one side of the bull gear 10 and one intermediate gear on an opposite side of the bull gear 10. In this arrangement, the large and expensive bull gear transfers torque from many teeth simultaneously, reducing its size accordingly. All the tooth engagements are unidirectional, that is, not reversing, allowing higher loads than other systems such as planetary systems.

Figure 3A:
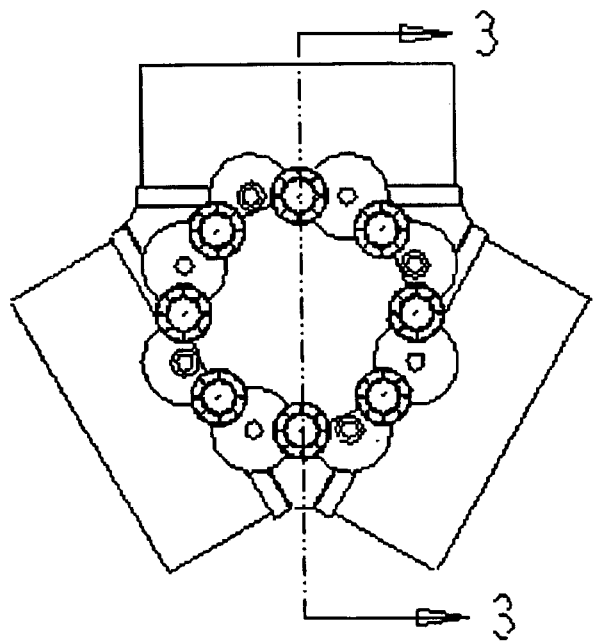
FIG. 3A is an end view of the invention.

FIG. 3A is an end view of the invention shown in FIG. 1. The generators 60 are closest with the rotors 90 behind the gearbox. Reference numerals in FIG. 3A correspond to components with the same reference numerals in FIG. 1.

Figure 3B:
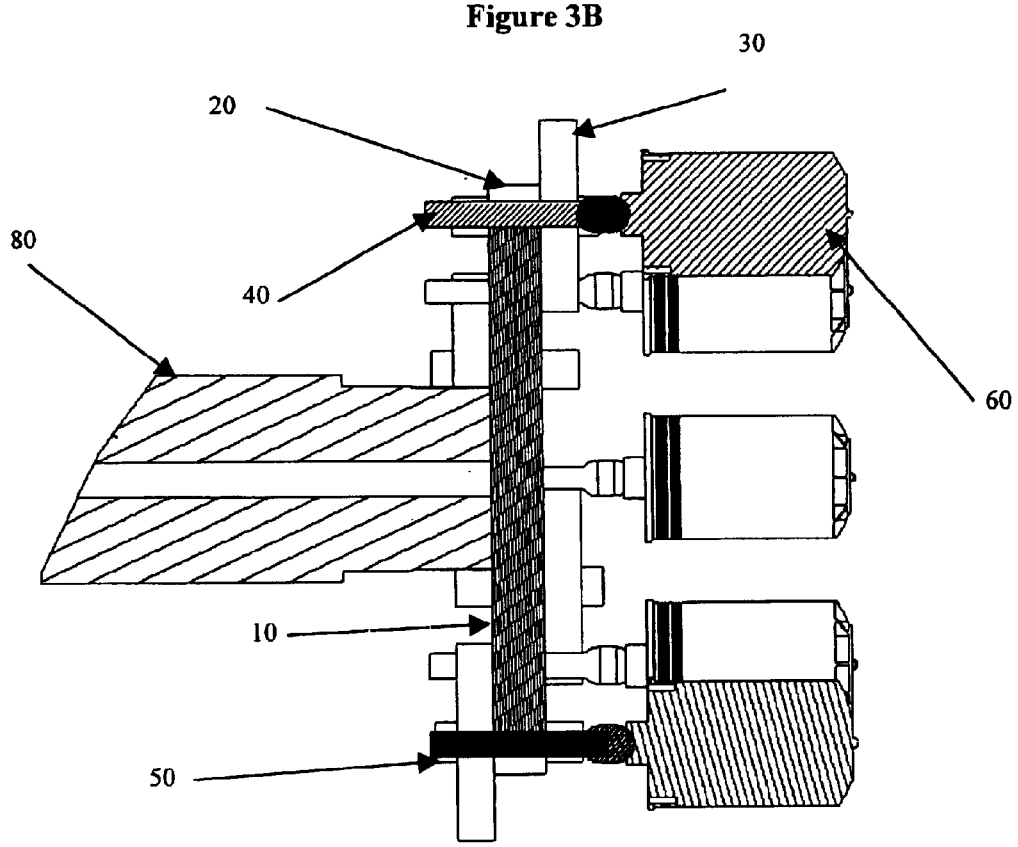
FIG. 3B is a cross-sectional view of the invention shown along view lines 3—3 of FIG. 3A.

FIG. 3B is a cross-sectional view of the invention shown in FIG. 3A. Reference numerals in FIG. 3B correspond to components with the same reference numerals in FIGS. 1, 2, and 3A.

The present invention via a torque-dividing gearbox distributes a high input torque of the rotor 90 between multiple generators 60. The sum of the power producing capacities of the generators 60 is equal to the maximum power delivered by the power-input shaft 80, and is equivalent to the power produced by a single generator in a conventional system.

It will be understood by those skilled in the art that the gears and pinions shown in the drawings may be replaced by any machine component consisting of a wheel attached to a rotating shaft that operate in pairs to transmit and modify rotary motion and torque (turning force) without slip.

It will be understood by those skilled in the art that the circular gear 10, shown as a bull gear in the drawings, could be replaced with a ring gear with gear teeth on an inside perimeter of the ring gear that engage pinions 20 on the shaft of intermediate gear 30.

The invention has been described with reference to a circular gear 10 having gear teeth around a perimeter of said circular gear, the circular gear being coupled to a main input shaft 80 that is driven by a source of energy. It will be understood by those skilled in the art that the main input shaft may be fitted directly onto the circular gear, or the main input shaft may be indirectly linked to the circular gear. For example, a reciprocating main input shaft that imparts rotational motion to said circular gear or the main input shaft may be combined with other gears or linkages to impart rotational motion to said circular gear.

It will also be understood by those skilled in the art that whereas the invention is described with reference to wind or water current sources of power, other sources of power may be utilized to impart torque to the main input shaft: fossil fuels, such as diesel motor-generator sets and gas turbines; nuclear fuels, such as steam turbines for nuclear power plants; solar energy; bio-energy technologies, such as making use of renewable plant material animal wastes; and industrial waste; thermal energy; automotive energy, such as electric cars; tunnel boring equipment; mining equipment; micro-turbines, such as those using natural gas, gas from landfills or digester gas; marine drives; and heavy equipment with a low speed drive.

While the invention has been particularly shown and described with reference to preferred embodiments thereof, it will be understood by those skilled in the art that the foregoing and other changes in form and detail may be made therein without departing from the scope of the invention.

What is claimed is:

1. An electric power-generating device that converts a source of energy to electricity including a main input shaft turned by said source of energy comprising:

A circular wheel coupled to said main input shaft;

A number of intermediate wheels located around a perimeter of said circular wheel, adjacent intermediate wheels being on opposite sides of said circular wheel;

Each one of said intermediate wheels being connected to an intermediate wheel that engages said circular wheel;

A plurality of output shafts, each one of said output shafts engaging two adjacent intermediate wheels; and, A number of generators, each generator being connected to a respective one of said output shafts.

2. The device of claim 1 wherein:

An output shaft of said plurality of output shafts includes a high-speed pinion with teeth that engage teeth on at least one of said intermediate gears, said output shaft being connected to an electric generator such that said high-speed pinion is not axially constrained.

3. The electric power-generating device of claim 1 wherein:

An output shaft includes double helical, high-speed pinions with helical teeth, which have opposing hands engaging teeth on two adjacent intermediate gears.

4. The electric power-generating device of claim 3 wherein:

Said output shaft is connected to an electric generator such that said high-speed pinions are not axially constrained.

5. The electric power-generating device of claim 1 wherein:

Said source of energy is fluid flow of wind or water; and,

Said main input shaft is coupled to a rotor having blades that rotate in response to said fluid flow.

6. The electric power-generating device of claim 1 wherein:

Each one of said output shafts includes double helical, high-speed pinions with helical teeth which have opposing hands engaging teeth on two adjacent intermediate gears.

7. The electric power-generating device of claim 6 wherein:

Each output shaft is connected by to an electric generator such that said high-speed pinions are not axially constrained.

8. An electric power-generating device that converts a source of energy to electricity comprising:

A main input shaft coupled to said source of energy;

A two-stage torque-dividing gearbox coupled to said main input shaft;

Said two-stage torque-dividing gearbox having a plurality of output shafts located around said main input shaft;

A plurality of generators, each connected to a respective one of said torque-dividing gearbox output shafts;

A first stage of said two-stage torque-dividing gearbox being a circular gear coupled to said main input shaft; and, A second stage of said two-stage torque-dividing gearbox being two intermediate gears, adjacent intermediate gears being on opposite sides of said circular gear and each driven by a respective intermediate shaft that engages said circular gear;

Each one of said torque-dividing gearbox output shafts being driven by two adjacent intermediate gears.

9. The device of claim 8 wherein:

An output shaft of said plurality of output shafts includes a high-speed pinion that engages teeth on at least one of said intermediate gears and is not axially constrained.

10. The electric power-generating device of claim 8 wherein:

An output shaft includes double helical, high-speed pinions with helical teeth, which have opposing hands engaging teeth on two adjacent intermediate gears.

11. The electric power-generating device of claim 10 wherein:

Said output shaft is connected by to an electric generator such that said high-speed pinions are not axially constrained.

12. The electric power-generating device of claim 8 wherein:

Said source of energy is fluid flow of wind or water; and,

Said main input shaft is coupled to a rotor having blades that rotate in response to said fluid flow.

13. The electric power-generating device of claim 8 wherein:

Each one of said output shafts includes double helical, high-speed pinions with helical teeth which have opposing hands engaging teeth on two adjacent intermediate gears.

14. The electric power-generating device of claim 13 wherein:

Each output shaft is connected to an electric generator such that said high-speed pinions are not axially constrained.

15. An electric power-generating device that converts fluid flow of wind or water to electricity comprising:

A rotor having blades that rotate in response to fluid flow;

A main input shaft coupled to said rotor;

A circular gear having gear teeth around a perimeter of said circular gear, said circular gear being coupled to said main input shaft;

A number of intermediate gears arranged around said circular gear, adjacent intermediate gears being on opposite sides of said circular gear, each one of said intermediate gears being connected to an intermediate pinion that engages said gear teeth on said circular gear;

A number of high-speed output pinions, each high-speed output pinion engaging two adjacent intermediate gears; and, A number of power generators, each one of said power generators coupled to one of said high-speed output pinions.

16. The device of claim 15 wherein:

An output shaft of said plurality of output shafts includes a high-speed pinion that engages gears on at least one of said intermediate gears and is connected to an electric generator such that said high-speed pinion is not axially constrained.

17. The electric power-generating device of claim 15 wherein:

An output shaft includes double helical, high-speed pinions with helical teeth, which have opposing hands engaging teeth on two adjacent intermediate gears.

18. The electric power-generating device of claim 17 wherein:

Said output shaft is connected to an electric generator such that said high-speed pinions are not axially constrained.

19. The electric power-generating device of claim 15 wherein:

Each one of said output shafts includes double helical, high-speed pinions with helical teeth which have opposing hands engaging teeth on two adjacent intermediate gears.

20. The electric power-generating device of claim 19 wherein:

Each output shaft is connected to an electric generator such that said high-speed pinions are not axially constrained.

\* \* \* \* \*